US009739226B2

(12) United States Patent
Elwart et al.

(10) Patent No.: US 9,739,226 B2
(45) Date of Patent: Aug. 22, 2017

(54) WALK-AWAY VEHICLE SHUTDOWN

(71) Applicant: Ford Global Technologies, LLC, Dearborn, MI (US)

(72) Inventors: Shane Elwart, Ypsilanti, MI (US); Walter Joseph Talamonti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 14/174,901

(22) Filed: Feb. 7, 2014

(65) Prior Publication Data

US 2015/0226146 A1 Aug. 13, 2015

(51) Int. Cl.
*F02D 41/04* (2006.01)
*B60R 16/02* (2006.01)
*F02D 41/06* (2006.01)
*B60W 30/06* (2006.01)
*F02N 11/08* (2006.01)

(52) U.S. Cl.
CPC ............ *F02D 41/042* (2013.01); *B60R 16/02* (2013.01); *B60W 30/06* (2013.01); *F02D 41/062* (2013.01); *F02N 11/0818* (2013.01); *F02N 2200/0803* (2013.01); *F02N 2200/0815* (2013.01); *F02N 2200/106* (2013.01); *Y02T 10/48* (2013.01)

(58) Field of Classification Search
CPC B62D 15/0285; B62D 15/028; B62D 15/027; B62D 15/0275; B62D 15/025; B62D 6/10; B60W 30/06; B60W 30/00; B60W 10/18; B60W 2510/20; B60W 2530/14; B60W 2540/24; B60W 2540/26; B60W 2550/10; B60W 30/18; B60W 40/08; B60W 40/09; B60W 50/0098
See application file for complete search history.

(56) References Cited

U.S. PATENT DOCUMENTS

| 6,060,981 | A | 5/2000 | Landes |
| 6,577,909 | B1* | 6/2003 | McGowan ............... G05B 9/02 180/271 |
| 7,110,877 | B2 | 9/2006 | Ozeki et al. |
| 9,424,047 | B2* | 8/2016 | Hall .......................... G06F 1/32 |
| 2007/0198145 | A1* | 8/2007 | Norris et al. ................... 701/23 |
| 2007/0216517 | A1* | 9/2007 | Kurpinski et al. ........... 340/5.72 |
| 2011/0080304 | A1* | 4/2011 | Toledo et al. .............. 340/932.2 |
| 2012/0310515 | A1* | 12/2012 | Kirshon et al. ............... 701/112 |
| 2013/0033361 | A1* | 2/2013 | Lickfelt et al. .............. 340/5.72 |
| 2013/0137372 | A1* | 5/2013 | Nishidai .................. H04B 5/00 455/41.1 |
| 2013/0162421 | A1* | 6/2013 | Inaguma .............. H04B 5/0031 340/438 |
| 2013/0191003 | A1* | 7/2013 | Hahne et al. ................... 701/99 |

(Continued)

FOREIGN PATENT DOCUMENTS

EP 2849017 A1 * 3/2015

*Primary Examiner* — Truc M Do
(74) *Attorney, Agent, or Firm* — Frank MacKenzie; Bejin Bieneman PLC

(57) ABSTRACT

A vehicle includes an engine, a park assist system, a passenger detection system configured to detect at least one passenger, and a processing device. The processing device initiates a shutdown sequence when no passengers are present in the vehicle. The shutdown sequence includes commanding the park assist system to park the vehicle and turning off the engine after the vehicle is parked.

18 Claims, 3 Drawing Sheets

(56) References Cited

U.S. PATENT DOCUMENTS

| | | | |
|---|---|---|---|
| 2013/0231824 A1* | 9/2013 | Wilson et al. | 701/26 |
| 2014/0052336 A1* | 2/2014 | Moshchuk et al. | 701/41 |
| 2014/0176326 A1* | 6/2014 | Tominaga | B60R 25/2009 340/457 |
| 2014/0358353 A1* | 12/2014 | Ibanez-Guzman et al. | 701/23 |
| 2014/0365032 A1* | 12/2014 | Park et al. | 701/2 |

* cited by examiner

WALK-AWAY VEHICLE SHUTDOWN

BACKGROUND

Advancements in autonomous vehicle technology allow passengers to rely on the vehicle to assume certain tasks. Not all driving tasks, however, are fully automated. Thus, some interaction from the driver or another passenger is sometimes required. Examples of such interactions include selecting a destination, route, and parking location. Moreover, even with autonomous vehicles, the driver or another passenger remains responsible for securing the vehicle, including turning off the engine, rolling up the windows, locking the doors, and setting an alarm system.

DETAILED DESCRIPTION

An exemplary vehicle includes an engine, a park assist system, a passenger detection system configured to detect at least one passenger, and a processing device. The processing device initiates a shutdown sequence when no passengers are present in the vehicle. The shutdown sequence includes commanding the park assist system to park the vehicle and turning off the engine after the vehicle is parked.

The vehicle and system shown in the FIGS. may take many different forms and include multiple and/or alternate components and facilities. While exemplary elements are shown, the exemplary components illustrated are not intended to be limiting. Indeed, additional or alternative components and/or implementations may be used.

Figure 1:
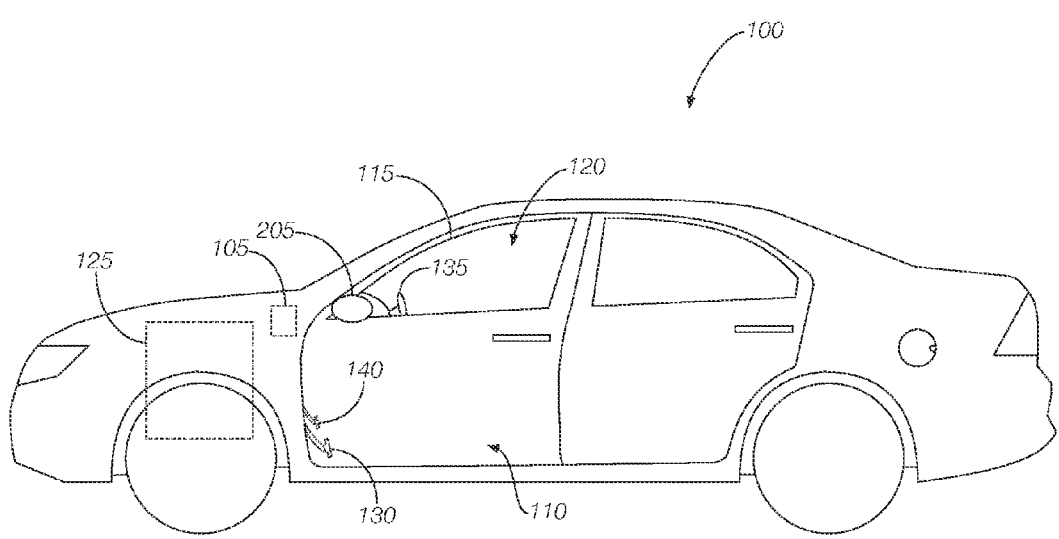
FIG. 1 illustrates an exemplary vehicle configured to initiate a shutdown sequence based on a proximity of a passenger to the vehicle.

An exemplary vehicle 100 implementing a system 105 for initiating a shutdown sequence is shown in FIG. 1. The vehicle 100 may include any passenger or commercial vehicle such as a car, truck, sport utility vehicle, crossover vehicle, van, minivan, bus, train, or airplane. The vehicle 100 may include various components such as doors 110 and windows 115 that open to provide access to a passenger compartment 120, an engine 125 that converts a fuel source into mechanical motion to propel the vehicle 100, and other controls, such as pedals 130, a steering wheel 135, a parking brake 140, or the like, each which may be located in the passenger compartment 120. As discussed with greater detail below with reference to FIGS. 2 and 3, the vehicle 100 may initiate a shutdown sequence that may include parking the vehicle 100 prior to turning off the engine 125.

Figure 2:
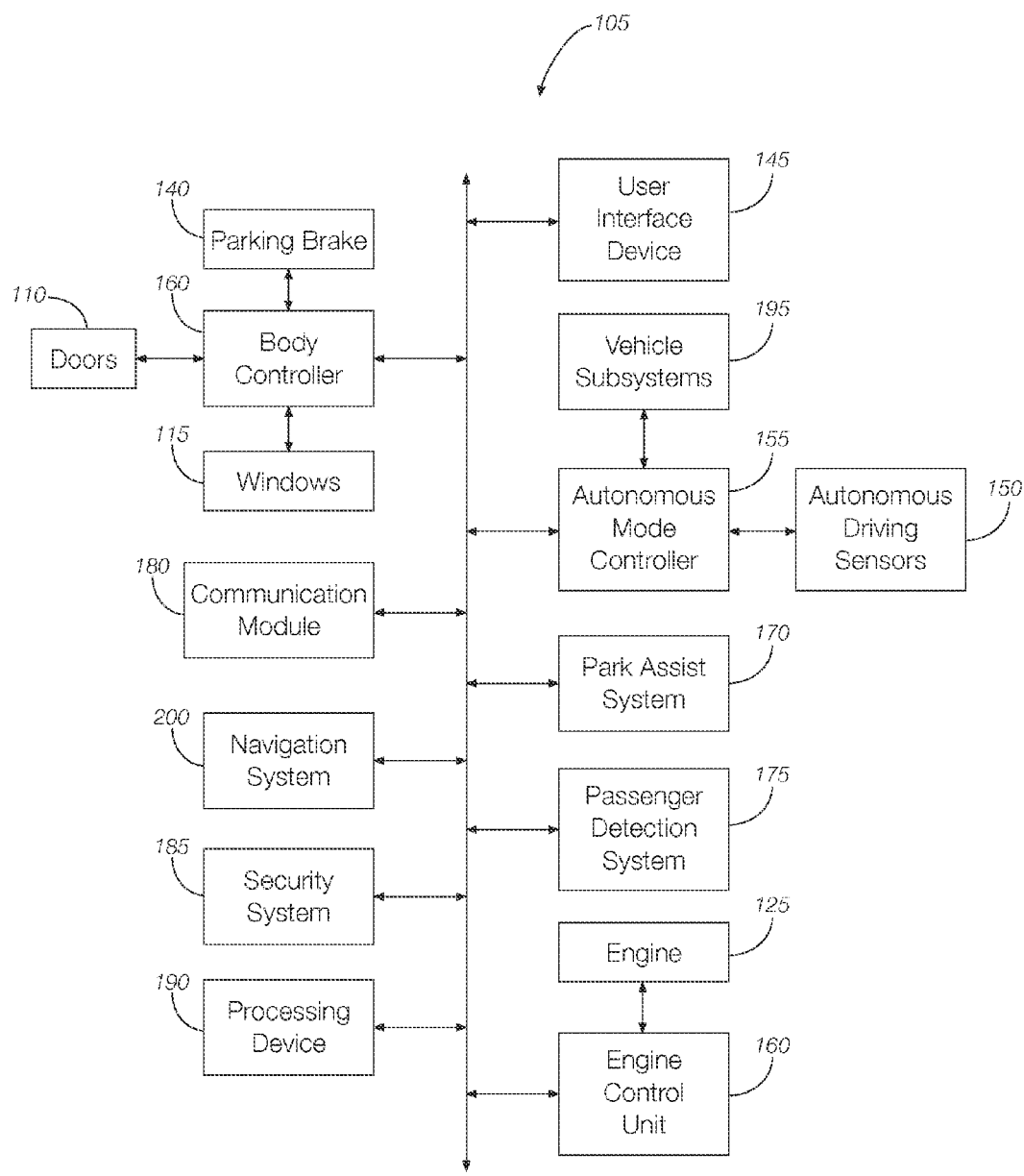
FIG. 2 is a block diagram of an exemplary system for initiating the shutdown sequence.

FIG. 2 is a block diagram of the system 105 for initiating the shutdown sequence that may be used with the vehicle 100 described above with reference to FIG. 1. The system 105, as shown in FIG. 2, includes a user interface device 145, autonomous driving sensors 150, an autonomous mode controller 155, a body controller 160, an engine control unit 165, a park assist system 170, a passenger detection system 175, a communication module 180, a security system 185, and a processing device 190.

The user interface device 145 may be configured to present information to a user, such as a driver, during operation of the vehicle 100. Moreover, the user interface device 145 may be configured to receive user inputs. Thus, the user interface device 145 may be located in the passenger compartment 120 of the vehicle 100. In some possible approaches, the user interface device 145 may include a touch-sensitive display screen and/or a verbal interface.

The autonomous driving sensors 150 may include any number of devices configured to generate signals that help navigate the vehicle 100 while the vehicle 100 is operating in an autonomous (e.g., driverless) mode. Examples of autonomous driving sensors 150 may include a radar sensor, a lidar sensor, a camera, or the like. The autonomous driving sensors 150 help the vehicle 100 "see" the roadway and/or negotiate various obstacles while the vehicle 100 is operating in the autonomous mode.

The autonomous mode controller 155 may be configured to control one or more subsystems 195 while the vehicle 100 is operating in the autonomous mode. Examples of subsystems 195 that may be controlled by the autonomous mode controller 155 may include a brake subsystem, a suspension subsystem, a steering subsystem, and a powertrain subsystem. The autonomous mode controller 155 may control any one or more of these subsystems 195 by outputting signals to control units associated with these subsystems 195. The autonomous mode controller 155 may control the subsystems 195 based, at least in part, on signals generated by the autonomous driving sensors 150.

The body controller 160 may be configured to monitor and control various electronic devices and/or subsystems 195 in the vehicle 100. For example, the body controller 160 may be configured to monitor and/or control the operation of power windows 115, power mirrors 205, battery current, air conditioning, door and trunk locks, the hood switch, the security system 185, a passenger detection system 175, adjustable seat controls, interior and/or exterior lighting controls, the defrost system 105, mirror heaters, seat heaters, steering wheel 135 heaters, or the like. The body controller 160 may be configured to receive signals from, and output signals to, any one or more of these and possibly other devices and/or subsystems 195, such as the processing device 190.

The engine control unit 165 may be configured to control the operation of the engine 125. Controlling the operation of the engine 125 may include causing the engine 125 to turn on or off under various circumstances as discussed in greater detail below. The engine control unit 165 may be configured to receive signals from the processing device 190.

The park assist system 170 may be configured to autonomously park the vehicle 100. The park assist system 170 may receive signals generated by one or more autonomous driving sensors 150, and in some instances, the park assist system 170 may receive a user input provided via, e.g., the user interface device 145 or a mobile device. An example of a user input may include a command for the park assist system 170 to assume control over the vehicle 100 for the purpose of parking the vehicle 100. The park assist system 170 may use, e.g., the autonomous driving sensors 150 to select a parking spot. In some instances, the park assist system 170 may, via the autonomous mode controller 155, navigate the vehicle 100 to the selected parking spot. Examples of parking spots may include a driveway, garage, parking structure, parking lot, street, or the like. The park assist system 170 may incorporate or use a navigation system 200, such as the Global Positioning System (GPS), to help park the vehicle 100. In addition, the park assist system 170 may follow a learned path to park the vehicle 100. The park assist system 170 and/or the navigation system 200 may be configured to output a signal representing the location where the vehicle 100 is parked. In some implementations, the park assist system 170 may be incorporated into the autonomous mode controller 155. In other words, the autonomous mode controller 155 may implement one or more aspects of the park assist system 170.

The passenger detection system 175 may be configured to detect the presence of one or more passengers in the vehicle 100. The presence of a passenger may be determined from sensors located in the seats of the vehicle 100, a camera located in the passenger compartment 120, whether a passenger is using an entertainment system 105 or adjusting a setting such as a climate control setting, the presence of a key or fob in or near the passenger compartment 120, whether the seatbelts are unbuckled, whether the driver door was opened and closed, whether an accelerometer reading suggests inactivity in the passenger compartment 120, or the like. The passenger detection system 175 may be configured to output a signal indicating the presence of the passenger in the passenger compartment 120. In some instances, the passenger detection system 175 may output a signal indicating the location within the passenger compartment 120 of the detected passenger(s).

The communication module 180 may be configured to facilitate communication between the vehicle 100 and one or more mobile devices such as a passenger's cell phone. The communication module 180 may be configured to communicate using any number of protocols. For instance, the communication module 180 may be configured to generate and transmit messages in accordance with a short message service (SMS) protocol to the passenger's mobile device. Alternatively or in addition, the communication module 180 may be configured to generate and transmit email messages to an email address accessible by the passenger. The communication module 180 may communicate wirelessly using, e.g., a cellular telecommunication protocol, a satellite telecommunication protocol, a short range communication protocol such as Bluetooth®, or Wi-Fi. In some possible approaches, the communication module 180 may be configured to receive a signal from the park assist system 170 or the navigation system 200 indicating the location where the vehicle 100 is parked. The communication module 180 may be configured to transmit a message, for instance, via an email or text message, to a passenger's mobile device.

The security system 185 may be configured to hinder unauthorized intrusion into the passenger compartment 120 of the vehicle 100 and unauthorized operation of the vehicle 100. The security system 185 may be enabled automatically after all passengers exit the vehicle 100 or in response to a user input provided via, e.g., a key fob or the user input device. In some instances, the security system 185 may become enabled after the vehicle 100 is secured. Securing the vehicle 100 may include locking the doors 110 and closing the windows 115.

The processing device 190 may be configured to initiate a shutdown sequence when no passengers are present in the vehicle 100. In some instances, the processing device 190 may be configured to initiate the shutdown sequence automatically. The shutdown sequence may include tasks such as commanding the park assist system 170 to park the vehicle 100, turning off the engine 125 after the vehicle 100 is parked, closing and/or locking the doors 110, closing the windows 115 including a sunroof if applicable, setting the parking brake 140, activating the security system 185, folding in side view mirrors 205, closing vents, disconnecting a high voltage supply, or the like. In some implementations, the processing device 190 may initiate the shutdown sequence by outputting commands to, e.g., the body controller 160, the autonomous mode controller 155, the park assist system 170, the security system 185, or other components of the vehicle 100.

The processing device 190 may be configured to wait a predetermined amount of time before initiating the shutdown sequence. For example, the processing device 190 may wait until the vehicle 100 is unoccupied for, e.g., 30 seconds or a minute, before initiating the shutdown sequence to compensate for situations where the driver briefly exited the vehicle 100 but intends to return. The amount of time may be based on a calibration setting or set by the driver or another passenger. Alternatively or in addition, the amount of time may be learned based on previous behavior. For instance, if the driver occasionally returns to the vehicle 100 and manually starts the engine 125 within a minute of exiting the vehicle 100, the processing device 190 may update the predetermined amount of time to approximately one minute. Moreover, the processing device 190 may be configured to receive an override signal provided by the driver or another passenger via, e.g., the user interface device 145. The override signal may indicate that the vehicle 100 will be temporarily unoccupied but that the driver or another passenger wishes for the processing device 190 to refrain from initiating the shutdown sequence, at least temporarily (i.e., until the next key cycle or the next time the vehicle 100 becomes unoccupied).

Moreover, the processing device 190 may be configured to initiate a startup sequence under certain circumstances. The startup sequence may include unlocking one or more doors 110, starting the engine 125, turning on a climate control system 105, turning on an entertainment system 105, and the like. The startup sequence may be initiated based on, e.g., a proximity of one or more passengers relative to the vehicle 100. The processing device 190 may detect the proximity of one or more passengers based on one or more signals received from the passenger detection system 175. As discussed above, the proximity of the passenger may be determined from the presence of the passenger in the passenger compartment 120 or a key fob or mobile device, such as a mobile phone, within a predetermined distance of the vehicle 100. The key fob and/or mobile device may be configured to transmit a command signal that, when received at the vehicle 100, may cause the processing device 190 to initiate the startup sequence. Thus, the processing device 190 may be configured to "listen" for command signals transmitted from the key fob and/or the mobile device.

In general, computing system s and/or devices, such as the user interface device 145, the autonomous mode controller 155, the body controller 160, the park assist system 170, the passenger detection system 175, the communication module 180, the security system 185, and the processing device 190, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
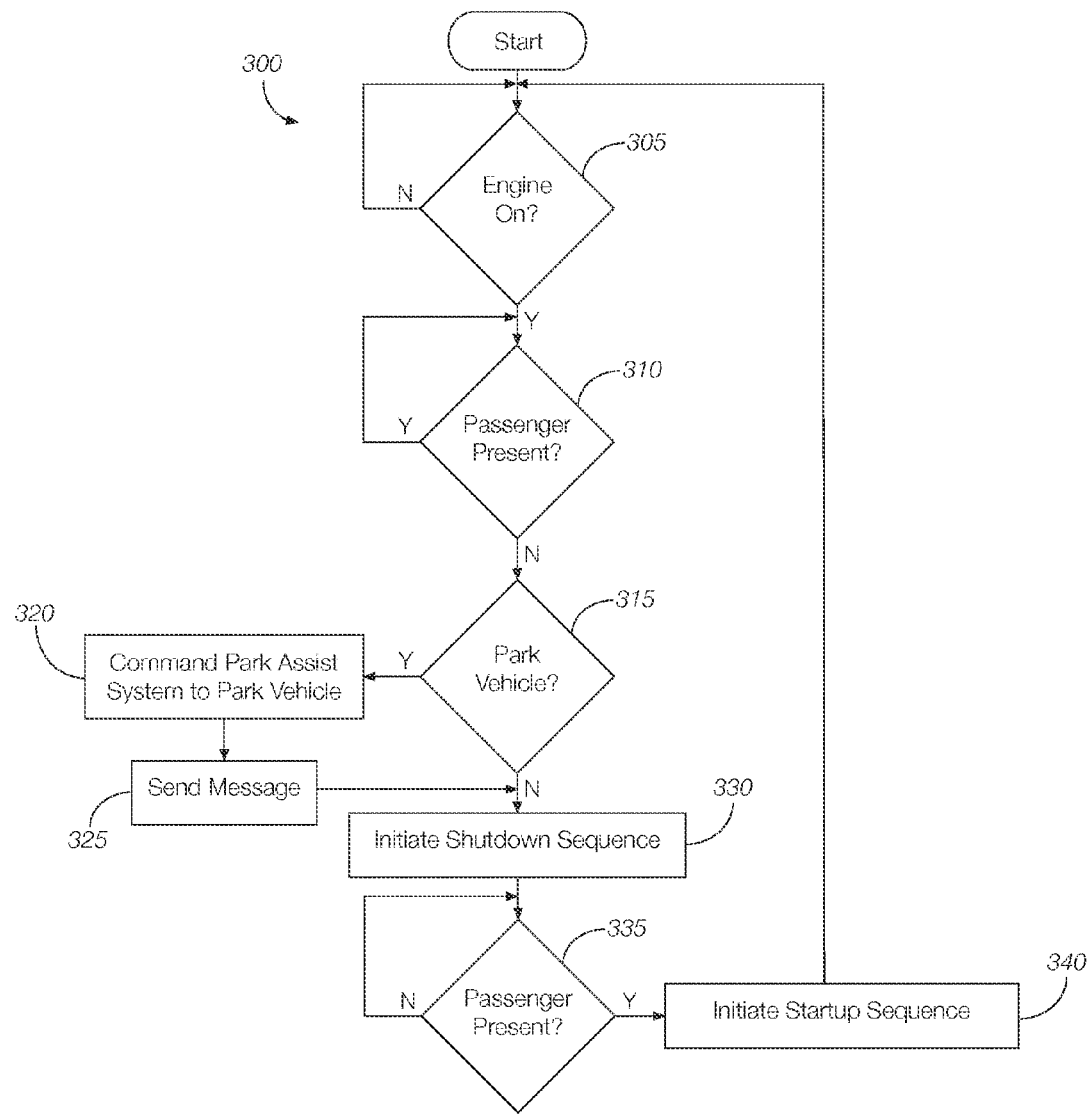
FIG. 3 is a flowchart of an exemplary process for initiating the shutdown sequence.

FIG. 3 is a flowchart of an exemplary process 300 that may be implemented by one or more components of the system 105. The process 300 may be executed by the vehicle 100 regardless of whether the vehicle 100 is operating in an autonomous or non-autonomous (e.g., manual) mode.

At decision block 305, the processing device 190 may determine whether the engine 125 is on. If so, the process 300 may proceed at decision block 310. If not, the process 300 may wait for the engine 125 to be turned on.

At decision block 310, the processing device 190 may determine whether any passengers are present in the vehicle 100. The presence of a passenger may be determined from, e.g., one or more signals received from the passenger detection system 175. The presence of a passenger may be determined from sensors located in the seats of the vehicle 100, a camera located in the passenger compartment 120, whether a passenger is using an entertainment system 105 or adjusting a setting such as a climate control setting, the presence of a key or fob in or near the passenger compartment 120, whether the seatbelts are unbuckled, whether the driver door was opened and closed, whether an accelerometer reading suggests inactivity in the passenger compartment 120, whether a mobile device belonging to the passenger is in the vicinity of the vehicle 100, or the like. If a passenger is detected, the process 300 may return to block 310 until no passengers are detected. When no passengers are present, the process 300 may proceed at decision block 315.

At decision block 315, the processing device 190 may determine whether to park the vehicle 100. The decision of whether to park the vehicle 100 may be determined from a command received via, e.g., the user input device or a mobile device running a mobile application, or automatically by the processing device 190. The processing device 190 may automatically decide to park the vehicle 100 under certain predetermined circumstances. The predetermined circumstances may be based on a location where the passengers exit the vehicle 100. For instance, if the passengers exit the vehicle 100 in a driveway or in front of an entrance to a building, the processing device 190 may determine that the vehicle 100 should be parked in a garage or another parking location. Moreover, the determination may be based on whether the vehicle 100 was manually parked. The processing device 190 may determine that parking is not necessary if, e.g., the vehicle 100 is located in a garage or parking space or in response to a user input indicating that no additional action concerning parking the vehicle 100 is needed. If the vehicle 100 is to be parked, the process 300 may continue at block 320. If parking the vehicle 100 is not necessary, the process 300 may continue at block 330.

At block 320, the processing device 190 may command the park assist system 170 to park the vehicle 100. Using signals generated by one or more autonomous driving sensors 150 and/or a user input, the park assist system 170 may select a parking spot and navigate the vehicle 100 to the selected parking spot with the aid of the navigation system 200 or by following a learned path. The park assist system 170 and/or the navigation system 200 may output a signal representing the location where the vehicle 100 is parked.

At block 325, the processing device 190 may communicate the signal representing the location where the vehicle 100 is parked to the communication module 180 and command the communication module 180 to transmit a message with the location. The message may be transmitted to, e.g., a user's mobile device or email address using any number of telecommunication protocols.

At block 330, the processing device 190 may begin to initiate the shutdown sequence. For instance, the processing device 190 may command the engine control unit 165 to turn off the engine 125, the body controller 160 close and/or lock the doors 110 if any are left open and/or unlocked when the passengers exit the vehicle 100, and/or close any windows 115, including a sunroof, that may be open. Moreover, the processing device 190 may command the security system 185 to activate. The shutdown sequence may include other tasks such as setting the parking brake 140, folding in side view mirrors 205, closing vents, disconnecting a high voltage supply, or the like. As discussed above, prior to initiating the shutdown sequence, the processing device 190 may wait a predetermined amount of time in case one or more passengers return to the vehicle 100. Moreover, the processing device 190 may determine whether an override signal was received. As mentioned above, the override signal may command the processing device 190 to refrain from initiating the shutdown sequence even though no passengers may be present.

At decision block 335, the processing device 190 may determine whether any passengers are present in or near the vehicle 100. The presence of one or more passengers may be determined from signals indicating whether a passenger has reentered the vehicle 100 or approached the vicinity of the vehicle 100 within a predetermined amount of time. Thus, the processing device 190 may detect the proximity of one or more passengers based on one or more signals received from the passenger detection system 175. As discussed above, the proximity of the passenger may be determined from the presence of the passenger in the passenger compartment 120 or, in some instances, from a signal transmitted from a key fob or a mobile device, such as a mobile phone, within a predetermined distance of the vehicle 100. If no passengers are present, the process 300 may repeat block 335. Otherwise, when a passenger is detected, the process 300 may continue at block 340.

At block 340, the processing device 190 may initiate the startup sequence. The startup sequence may include unlocking one or more doors 110, starting the engine 125, turning on a climate control system 105, folding out the side view mirrors 205, turning on an entertainment system, and the like. The startup sequence may be initiated based on, e.g., a proximity of one or more passengers relative to the vehicle 100. After block 355, the process 300 may return to block 305 or may end.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
   at least one window;
   an engine;
   a park assist system;
   a passenger detection system configured to detect at least one passenger in the vehicle and detect when all passengers have exited the vehicle; and
   a processing device programmed to initiate a shutdown sequence a predetermined amount of time after the passenger detection system detects that all passengers have exited the vehicle, wherein the shutdown sequence includes closing the at least one window, commanding the park assist system to park the vehicle, and turning off the engine after the vehicle is parked.

2. The vehicle of claim 1, further comprising doors configured to permit access to a passenger compartment, and wherein the shutdown sequence includes locking the doors.

3. The vehicle of claim 2, wherein the shutdown sequence includes commanding the doors to close.

4. The vehicle of claim 1, wherein the shutdown sequence includes setting a parking brake.

5. The vehicle of claim 1, further comprising a security system, and wherein the shutdown sequence includes commanding the security system to activate.

6. The vehicle of claim 1, wherein the processing device is configured to initiate a startup sequence.

7. The vehicle of claim 6, wherein the startup sequence includes turning on the engine based on a proximity of at least one passenger to the vehicle.

8. The vehicle of claim 1, further comprising a communication module configured to transmit a message, wherein the message identifies a location of the vehicle.

9. The vehicle of claim 8, further comprising a navigation system configured to determine a location of the vehicle and provide the location to the communication module.

10. The vehicle of claim 9, wherein the park assist system is configured to navigate the vehicle to the location.

11. The vehicle of claim 1, further comprising side-view mirrors, and wherein the shutdown sequence includes commanding the side-view mirrors to fold in.

12. A vehicle system comprising:
   an passenger detection system programmed to detect a presence of at least one passenger in a vehicle and when all passengers have exited the vehicle; and
   a processing device programmed to initiate a shutdown sequence a predetermined amount of time after the passenger detection system detects that all passengers have exited the vehicle, wherein the shutdown sequence includes commanding at least one vehicle window to close, commanding a park assist system to park the vehicle and turning off a vehicle engine after the vehicle is parked.

13. The vehicle system of claim 12, wherein the shutdown sequence includes locking at least one vehicle door.

14. The vehicle system of claim 12, wherein the shutdown sequence includes commanding a vehicle security system to activate.

15. The vehicle system of claim 12, wherein the processing device is configured to initiate a startup sequence including turning on the vehicle engine based on a proximity of at least one passenger to the vehicle.

16. A method comprising:
- detecting a presence of at least one passenger in a vehicle;
- detecting when all passengers have exited the vehicle;
- waiting a predetermined period of time after all passengers have exited the vehicle; and
- initiating a shutdown sequence after all passengers have exited the vehicle, the shutdown sequence including:
  - commanding at least one vehicle window to close,
  - commanding a park assist system to park the vehicle, and
  - turning off a vehicle engine after the vehicle is parked.

17. The method of claim 16, wherein the shutdown sequence includes:
- commanding at least one vehicle door to lock;
- commanding side-view mirrors to fold in; and
- commanding a vehicle security system to activate.

18. The method of claim 16, further comprising initiating a startup sequence, including turning on the vehicle engine based on a proximity of at least one passenger to the vehicle.

* * * * *